United States Patent [19]
Vito

[11] Patent Number: 5,636,593
[45] Date of Patent: Jun. 10, 1997

[54] MECHANIZED ANIMAL LITTER APPARATUS

[76] Inventor: Emanuel T. Vito, 685 Ave. "C", Stroudsburg, Pa. 18360

[21] Appl. No.: 391,436

[22] Filed: Feb. 21, 1995

Related U.S. Application Data

[60] Division of Ser. No. 12,180, Feb. 2, 1993, Pat. No. 5,390,628, which is a continuation-in-part of Ser. No. 650,900, Feb. 5, 1991, Pat. No. 5,183,009.

[51] Int. Cl.$^6$ .................................................. A01K 1/01
[52] U.S. Cl. ........................... 119/165; 248/99; 119/170
[58] Field of Search ................................. 119/161, 165, 119/168, 166, 167, 170; 211/12, 83, 84; 248/95, 99, 100, 101

[56] References Cited

U.S. PATENT DOCUMENTS

| | | | |
|---|---|---|---|
| 3,388,882 | 6/1968 | Burroughs | 248/101 |
| 4,921,193 | 5/1990 | Benesch | 248/99 |

FOREIGN PATENT DOCUMENTS

| | | | |
|---|---|---|---|
| 380320 | 12/1907 | France | 248/99 |

*Primary Examiner*—Todd E. Manahan
*Attorney, Agent, or Firm*—Charles A. Wilkinson

[57] ABSTRACT

An apparatus and method are provided for partially automating the placement of litter bags in animal litter pans. The apparatus uses two pivoted arras over the tops of which the upper portion of a litter bag may be folded when the arms are extended upwardly. The arms are then pivoted downwardly to spread out the litter bag either in a litter pan or upon the base upon which the arms are pivoted. Thus the apparatus also provides a means for complete elimination of an animal litter pan. Litter may be placed within the litter bag either before it is folded over the pivot arms or after. It is preferred to use prepackaged litter containers and several prepackaged litter containers are disclosed which can be used with the particular apparatus or other apparatus including ordinary litter pans.

11 Claims, 7 Drawing Sheets

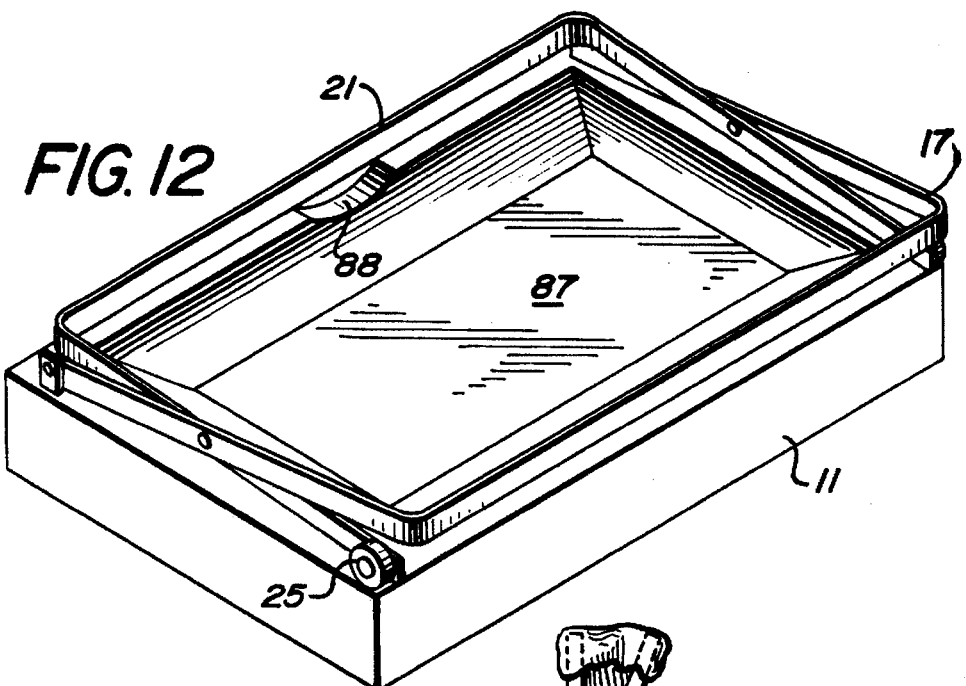
FIG. 12
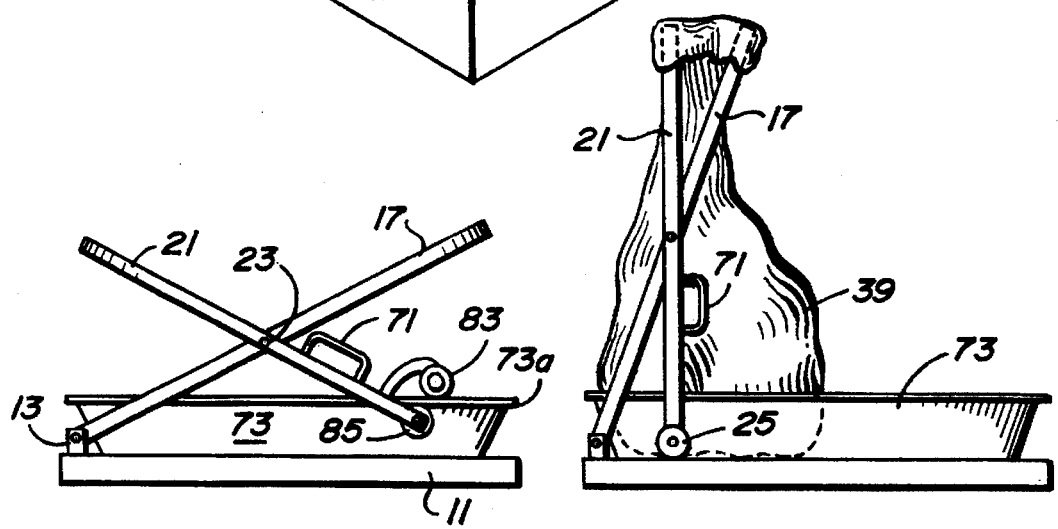
FIG. 11
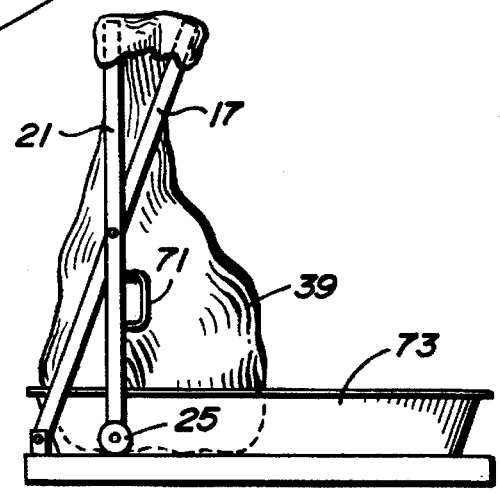
FIG. 13
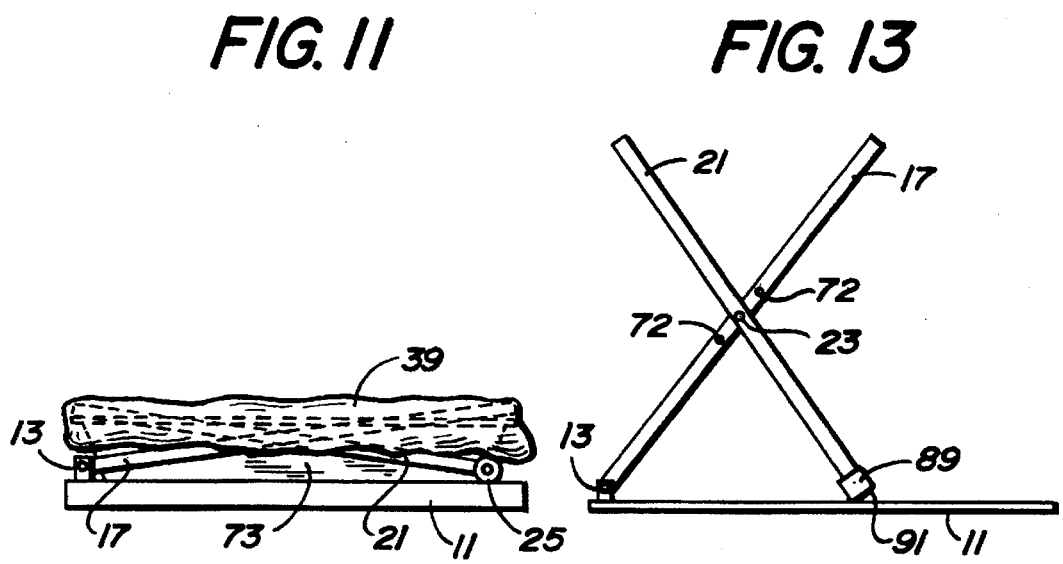
FIG. 14
FIG. 15

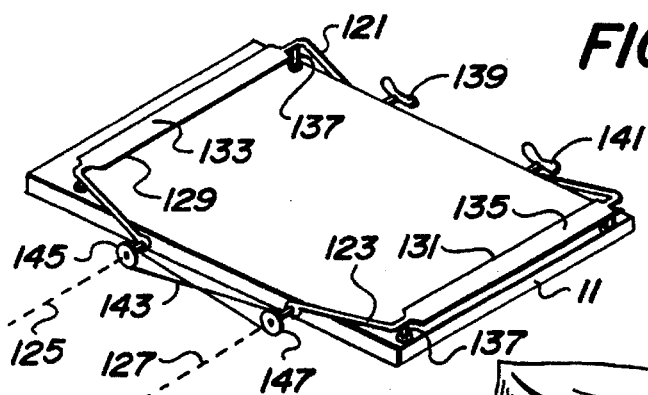
FIG. 20
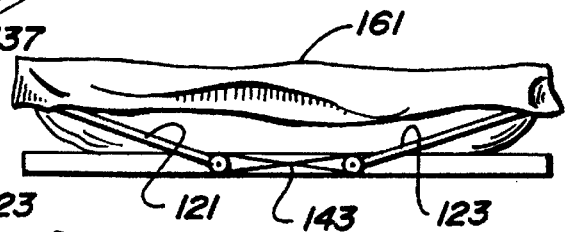
FIG. 22
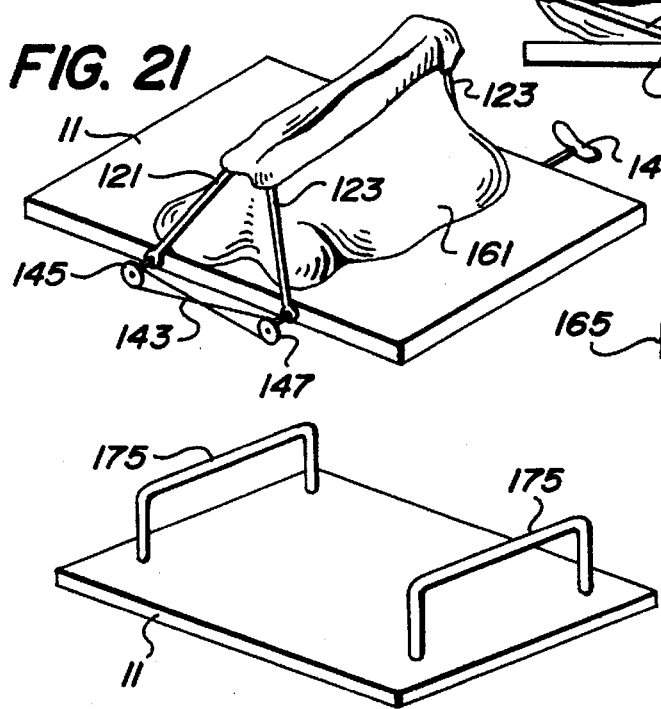
FIG. 21
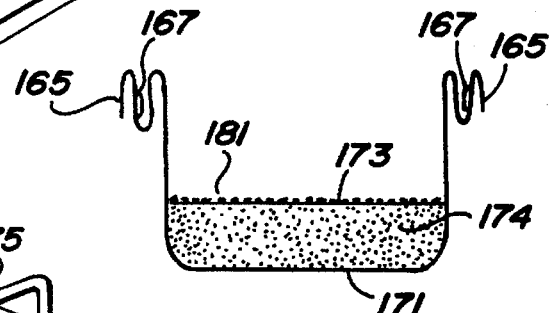
FIG. 24
FIG. 25
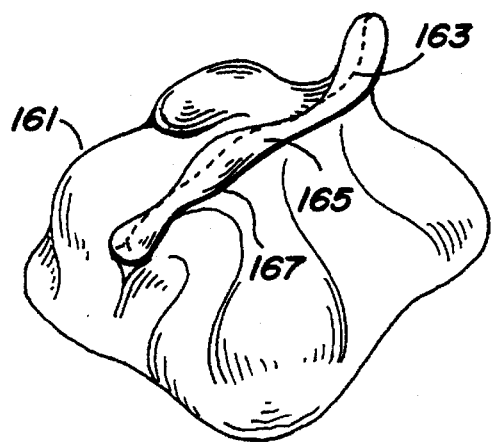
FIG. 23
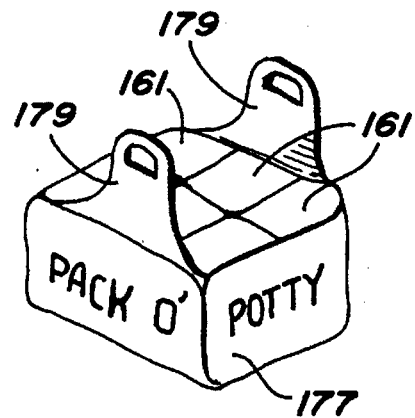
FIG. 26

MECHANIZED ANIMAL LITTER APPARATUS

RELATED APPLICATIONS

This application is a division of U.S. application Ser. No. 08/012,180 filed Feb. 2, 1993, now U.S. Pat. No. 5,390,628, which was itself a continuation-in-part of U.S. application Ser. No. 07/650,900 filed Feb. 5, 1991, now U.S. Pat. No. 5,183,009.

BACKGROUND OF INVENTION

(1) Field of the Invention

This invention relates to so-called animal litter devices and more particularly to a litter receiver in which the elimination products of cats and similar animals may be deposited, and more particularly still, to an apparatus that will facilitate the handling of both of new litter materials and used litter materials relatively automatically with minimum human handling as well as a minimum dusting and dirt generation.

(2) Description of the Prior Art

Domestic animals such as dogs and cats are kept as pets by many persons, not only because they are companionable and intriguing as well as useful in various capacities such as watchdogs and vermin catchers, but also because to a large extent, unlike many animals, they can be conveniently house trained, i.e. trained not to mess or litter the homes of their owners. Dogs, for example, like humans, and notably unlike, for example, monkeys and many other animals, will under natural conditions, if possible, go beyond their den or home area to defecate, preferring to go to surrounding territories or yards rather than eliminating in their owner's yards or homes. This proclivity not to dirty their home territory makes dogs fairly easily toilet trainable and together with their proclivity to bond with humans makes them widely acceptable as house pets.

Cats, on the other hand, have a natural instinct to bury or cover their elimination products in order to reduce odors that might otherwise alert their natural prey to the cat's immediate presence as well as to the presence of the cat's home territory. This tendency of the cat family, including the normal domesticated cat, makes cats also relatively easily elimination trainable and the cat's proclivity to bury its elimination products can be taken advantage of by providing within the home, easily movable unconsolidated materials such as sand in a sandbox or the like for the cat to eliminate in so such cat will have a minimum tendency to go elsewhere. Alternatively, no indoor materials suitable for digging in or for burial of elimination products may be provided within the home so that the cat evidences a natural tendency to seek to go outside to locate suitable digging areas for burial of its waste.

Under modern conditions, it has become more and more inconvenient and, in many cases, dangerous for pet cats to venture from their owner's homes and so-called litter boxes have been introduced in which the cat can dig a hole and then cover over its own leavings in such hole. An entire industry has emerged to supply so-called "litter" materials or suitable clean, odorless unconsolidated digging materials which can be used in litter boxes. For this purpose, builder's sand was the original choice, but this has been largely now superseded by dried clay pellets, treated saw dust and/or wood chips and the like. More recently, considerable effort has been expended in developing so-called self-clumping cat litters which tend to surround or clump about elimination products in the dry cat litter allowing such products to be removed from a cat litter pan or the like by removing the relatively sanitary clumps from the litter, allowing the litter material to be used longer.

Such digging or "litter" materials have traditionally been placed or held in shallow pans, referred to as litter pans or litter boxes, in which the litter material is placed in loose piles in which the cat is invited, by the consistency of the material, to dig. After a certain amount of cat leavings are accumulated in such pans, buried or half buried as the case may be in the litter, the litter material is removed and disposed of, often by being deposited in either the owner's yard or in the trash.

In more recent years, it has become customary among many pet owners to place a plastic bag in the litter box before placing the litter or digging material therein. In this manner, the cat's droppings, in the form of both solid and liquid waste, is prevented from contacting the bottom of the box or container and soiling it and the cat mess may be removed in the plastic bag with the used litter or digging material and discarded as a unit. Frequently, the cat waste has tended to partially consolidate or clump the litter material about it and many pet owners have regularly removed such clumped separately prior to the entire load of litter becoming fouled. As indicated above, there has recently come into use a self-clumping cat litter which accentuates such natural clumping and enables litter to be used for much longer periods before discarding the bulk portion and refilling the litter receptacle. As indicated above, therefore, an entire industry has arisen to supply not only the so-called litter, but also litter pans for animal use as well as plastic bags for lining such pans or containers plus, in addition, the various dried bulk materials for placement in the bags, both to contain and absorb feline waste and to encourage cats to dig and eliminate in such plastic containers.

Various disposal and manipulative containers have been devised in an attempt to rationalize the collection of cat waste in the usual cat litter containers. Illustrative of the state of the art in this regard are the following recent U.S. patents.

U.S. Pat. No. 4,541,360 issued Sep. 17, 1985 to Q. D. Higgins et al. discloses a disposable animal litter box including a fluid-tight bottom and a cover for the box. After use, the box, which is preferably made from readily disposable materials, may be closed and the entire unit disposed of.

U.S. Pat. No. 4,709,827 issued Dec. 1, 1987 to J. Jaillet et al. discloses a home-type litter box intended to be lined with a plastic bag or the like which is secured to the inside of the container. The entire container may be pivoted together after use to dump the contents into a central pile allowing the litter to be enfolded in the bag and removed, leaving the litter container available for insertion of a clean replacement bag.

U.S. Pat. No. 4,807,563 issued Feb. 28, 1989 to R. L. Berry et al. discloses a disposable litter box which may be opened out and lined with a conventional plastic litter bag and, when ready for disposal, folded shut into a suitcase form for removal to disposal.

While prior patents such as the Higgins et al. disposable litter box have tried to decrease the handling of feline waste products and similar cardboard litter boxes have, more recently still, appeared on the market already filled and ready for use and can thereafter be folded up and disposed of in the trash certain problems remain and such arrangements have as yet not become overly popular. There is a need, consequently, for a better and more convenient system.

In the applicant's prior application, the use of prefilled plastic litter containers was disclosed for use with the particular apparatus of the invention and the apparatus in use with the prefilled bags was claimed.

The applicant has now invented both an improved prefilled cat litter container or bag for use in his apparatus and otherwise and an improved apparatus for use with such bags as well as with more conventional litter bags.

While some of the prior art such as the patents referred to above have attempted to address the problem of conveniently folding up and disposing of used cat and other animal litter containers, the process of servicing animal litter boxes is still, at best, an inconvenient and sometimes messy operation which takes a surprising degree of manual dexterity, particularly in folding up the customary plastic litter liner and securing it without spilling the contents. Such operations may be particularly burdensome to elderly or partially disabled persons and is not a favored chore for anyone. There has been a need, therefore, for a more efficient and effective method and/or means for handling animal litter. Both elderly persons and others have, furthermore, found it both inconvenient and dirt engendering to place litter material in the litter bag within the litter pan or receptacle, which usually entails pouring the litter material from a large bag or reservoir of litter into the actual litter bag or receptacle in which it is to be used. This invariably raises or releases considerable dust or fine particulates which then pass into the air, becoming an irritant to both the airways of the person transferring the litter material and a household dirt source. Much of this dust can be eliminated by providing, as suggested in the applicant's previous application for patent, a prefilled bag adapted to be opened only after mounting upon a support apparatus or in the pan in which it is to be used. Additional steps can also be used to minimize dust or small particulate material passage into the surrounding atmosphere as explained hereinafter.

OBJECTS OF THE INVENTION

In view of the clearly perceived need for a more effective system for handling animal litter, it is an object of the present invention to provide a more convenient and automated method and means to handle animal litter and particularly to spread out plastic litter bags prior to use and fold and secure such bags after use for disposal.

It is a further object of the invention to provide a litter receipt and disposal arrangement and means that is substantially automatic in operation.

It is a still further object of the invention to provide an animal litter arrangement that can be easily operated by elderly and/or disabled persons.

It is a still further object of the invention to provide a method of spreading out and folding up animal litter bags for use and disposal, which method is substantially automatic in operation, at least up to the step of securing the litter bag after closure.

It is a still further object of the invention to provide a litter bag handling apparatus that may dispense with the customary litter box for containing a litter bag.

It is a still further object of the invention to provide a litter bag adapted to be prefilled and erectable in a use position without release into the surrounding atmosphere of a substantial amount of small particulates or dust.

It is a still further object of the invention to provide a prefilled litter bag having an arrangement for cooperation with a supporting apparatus to facilitate closure of said bag with a minimum amount of difficulty.

It is a still further object of the invention to provide a prefilled cat litter bag which is easy to handle and to close.

It is a still further object of the invention to provide a cat litter bag having a reinforced bottom to prevent cats from piercing the bottom with their claws during digging or covering movements.

It is a still further object of the invention to provide a cat litter bag having means to interconnect such bag with support and opening apparatus.

It is a still further object of the invention to provide a cat litter bag easily arrangeable to hold in place upon a foldable support framework.

It is a still further object of the invention to provide an animal litter arrangement that is effective in automatically spreading out a litter bag into operative position for use by an animal and subsequently after use, folding up said litter bag in a convenient arrangement for securing said bag for disposal.

It is a still further object of the invention to provide an automatic litter handling apparatus having a minimum number of moving parts.

It is a still further object of the invention to provide an automatic litter handling arrangement that is acceptable to animals that are to use it and attractive to the owners.

Other objects and advantages of the invention will become apparent from the appended drawings and accompanying description.

BRIEF DESCRIPTION OF THE INVENTION

The difficulties heretofore encountered in the handling of pet litter boxes and their contents have been considerably alleviated by the present invention wherein a base is provided together with two lever-type action support arms either two scissors action-type support arms, one of which is free to move along the base as the arms are moved from a lower more or less parallel position disposed at a low angle with respect to the base and each other to an erected angular position disposed more or less vertically or at a large angle with respect to the base. In a straight lever-type support means two lever arms pivot directly upon the base of the apparatus and the upper ends of the lever arms are inserted into pockets or folded sections of the litter bags. The scissors action arm device may be operated manually, by power means, or by potential energy storage-and-release means. The apparatus is operated by temporarily securing a litter bag by folding or otherwise to the free ends of the scissors apparatus while in an upwardly erected position and then moving said scissors arms to a lower position in which the arms are extended toward the ends of the base whereby the litter bag is held open in receiving position for subsequent use by a cat or other similar domestic animal. Usually the bag will in this position be partially filled with litter material in which the animal digs to both deposit and cover its droppings or elimination products. After the bag has been used by the animal, usually at least several times, the scissors arms are again moved to their upward positions whereby the two edges of the top of the bag are brought toward each other and the litter material centralized in the bottom or lower portion of the bag. The top of the bag is then disengaged from the tops of the scissors arms and secured together for disposal, and a replacement bag mounted upon the upper ends of the arms. The apparatus may be used with or without a cat litter box placed upon the base under the scissors arms. Alternatively, the base may comprise a litter pan in itself. The straight pivoted arm device disclosed in this application is operated in a substantially similar manner as the scissors-type device, but has some advantages for certain arrangements for securing or sealing the litter bag after use.

The litter bags themselves may be of several types. The most sophisticated prefilled bag will comprise a bag having a permanently turned down top edge or cuff which fits over the top of the lever arms and in which the bag is opened as the lever arms are spread outwardly. The bag will preferably be prefilled and will have an integral sealing means in the top which will preferably automatically seal the top edges when they are brought together. Preferably the lever arm apparatus will have flat upper ends between which the tops of the bags will will be compressed to effect sealing. The bottom of the bags which rest alternatively upon the bottom of the litter pan or on the top of the base of the erection apparatus are also preferably of extra strength material to resist piercing by feline claws. Last, but not least, the bag may be supplied with a dust shield directly over the litter material which is either removed or pierced by the cats claws after the bag is placed in service. Such dust shield may be made of a thin plastic or preferably paper composition which is easily pierceable or removable by a cats claws and or by wetting and which does not inhibit felines from digging through into the underlying litter material. To this end the thin paper material may have a thin film of litter material adhered to the surface of such material to simulate for a cat the underlying particulate litter material.

BRIEF DESCRIPTION OF THE DRAWINGS

FIG. 11 is an elevation of an alternative arrangement of the invention in which a cat litter pan is used with roller-type friction-reducing means arranged to maintain oriented contact with the litter pan.

FIG. 12 is an elevation of an often preferred embodiment of the invention in which the scissors arms are both arranged generally along the long dimension of the base rather than transversely to the long dimension of the base in order to generally decrease the necessary movement of the frame from use position to erected position.

FIG. 13 is an elevation of the apparatus of FIG. 11 in position for initial mounting of a litter bag on the frame as shown, or just prior to removal therefrom of the litter bag.

FIG. 14 is an elevation of apparatus similar to that shown in FIGS. 7 and 13 oriented in use position with a litter bag also disposed in use position or conformation upon the apparatus. The scissors frame is shown in outline through the litter bag.

FIG. 15 is an elevation of a preferred alternative embodiment of the invention in which the base is constructed of a thin, stiff material and the anti-friction means comprises plastic caps on the end of the movable scissors legs with a flat on the bottom of the plastic caps defining the erected position of the scissors arms.

FIG. 20 is an isometric view of an alternative embodiment of the invention which involves the use of two pivoted arms that are not connected in a scissor fashion.

FIG. 21 is an isometric view of the apparatus shown in FIG. 20 in either the initial mounting position or in a position preparatory to sealing and removal.

FIG. 22 is an elevation or side view of the apparatus shown in use position with a cat litter bag in place.

FIG. 23 is an isometric view of a prefilled or prepackaged cat litter bag in accordance with the present invention showing the sealed top of the bag and a folded down cuff around the top forming pockets into which the top of the pivoted arms of the erection apparatus may fit.

FIG. 24 is a side elevation of the prefilled bag of the invention showing a cross section through a preferred folding arrangement of the supporting cuffs.

FIG. 25 is an isometric view of an animal litter support apparatus that will support one of the prefilled bags of the invention in operating position.

FIG. 26 is an isometric view of a package of prefilled cat litter bags in accordance with the invention.

DESCRIPTION OF THE PREFERRED EMBODIMENTS

Figure 1:
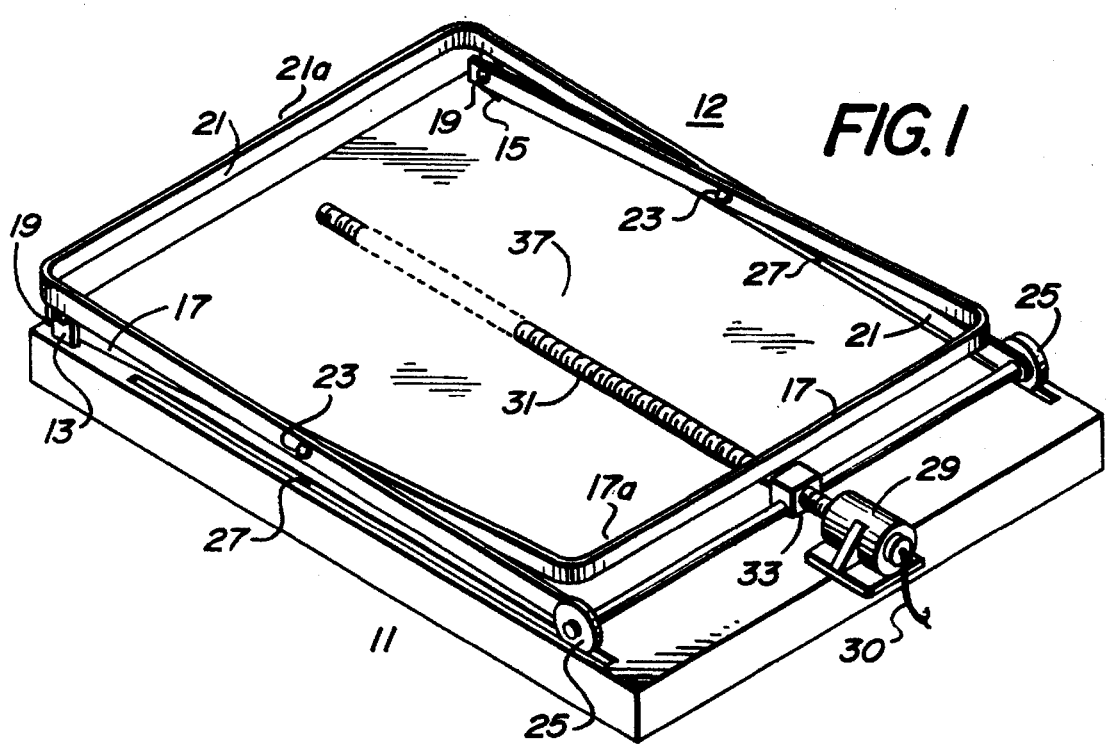
FIG. 1 is a isometric view of a power-driven embodiment of the invention in operative position for use by an animal, but with the litter bag omitted from the scissors frame for better visibility of the frame arrangement.

The present invention provides a method and apparatus for at least partially automating the placement and replacement of cat litter bags in a cat litter box. It also provides a prefilled cat litter bag designed for use on the apparatus of the invention as well as separately.

As explained above, it has become customary in households having cats to provide a so-called cat litter pan in which natural granular material such as sand or commercial granular material such as pelletized clay, sawdust or other heat-treated and usually at least partially sterilized material is placed in the litter pan to encourage the natural proclivity of cats to dig in earth-like material and bury their elimination products, both liquid and solid. After use by a domestic cat, the granular material and included elimination products are gathered up, frequently with a small spade or trowel, and discarded. More recently it has become customary to insert a plastic bag similar or occasionally substantially identical to a shallow garbage bag in the litter pan or receptacle to prevent contact of moist or wet elimination products with the sides and bottom of the litter pan with resulting unsightly and unsanitary soiling which becomes difficult to remove. The litter bag can then, provided it has not been perforated by feline claws during the animals digging or pawing through the litter, be fairly easily removed together with the contained granular litter material plus any included animal elimination products in the litter material. The edges of the bag can then be brought together and firmly secured by some suitable securing means and the entire package discarded.

While the use of a plastic litter bag has constituted a large step forward, it has by no means solved the mess and bother of attending to animal litter pans, i.e. emptying, cleaning and refilling such litter pans. Handling even the plastic litter bags is messy and tedious for almost everyone involved and inevitably involves being exposed to odors and dust incident to such handling which is unpleasant at best and, for some persons, intolerable. Furthermore, the handling of the plastic litter bag when filled with litter is frequently difficult, if not impossible, for the elderly, infirm or disabled, and young children often cannot be trusted to correctly handle the materials.

The present invention solves some of these major objections by providing an automatic method and means for both inserting the litter bag or "cat litter bags" into proper position for receiving cat elimination products and for gathering up said plastic litter bag subsequent to use and bringing it into position from which it can be easily secured at the top prior to removal from the apparatus and disposal. This is accomplished by providing a pair of pivoted arms, at least one of which is pivotally secured to a base and which may be movably secured together near the center to provide a scissors action. A cat litter bag, which in many instances when using the invention can be an ordinary plastic garbage bag, although a specialized prefilled bag according to the invention is preferred, can be easily partially folded over the tops of the two folding arms while they are extended generally upwardly in a manner such that the center of the bag is dependent between the two arms. The two arms are then rotated downwardly and away from each other toward a more horizontal position at the same time stretching out the top of the bag into a general open top container configuration. The open top container configuration may be superimposed over an actual cat litter container or, in many cases, may merely be rested directly upon the top of the base with the sides of the resulting litter receptacle constituted by the partially raised arms themselves. After use by an animal of the container configuration constituted by the litter bag supported by the framework as an elimination means, the scissor arms or other pivoted arms may then be raised into their original erected position carrying the sides of the bag upwardly again and at the same time centralizing the cat litter in the lower center of the bag, at which point the top of the bag may be slipped from the arms with very little effort and the bag closed by a fastening. In a preferred arrangement the litter bag will be a prefilled bag designed for convenient attachment and detachment from the apparatus and having other specialized features adapting it for sanitary mounting and use on the apparatus or even by itself. These arrangements are illustrated in the following descriptions of the various constructions shown in the various appended figures more particularly described in the explanatory material set forth as follows.

FIG. 1 is an isometric view of a preferred apparatus in accordance with the invention in which a base 11 is provided with short brackets 13 and 15 at one end. A first preferably continuous pivot arm 17 is rotatably attached at its two ends to the brackets 13 and 15 by first pivot fastenings 19 of any suitable type. These pivot fastenings allow free rotation or pivoting of the pivot arm 17 from or about the brackets 13 and 15 so far as such pivoting is not restrained by other structure such as, for example, the base 11 itself, which serves as a physical barrier to full rotation or pivoting of the pivot arm 17.

A second pivot arm 21 is rotatably attached by second pivot fastenings 23 to the first pivot arm 17 approximately in the middle of both sides of the two pivot arms. The central movable connection of the two pivot arms provides a movable scissors-type arrangement between the two pivot arms forming a scissors assembly 12. The free ends of the second pivot arm 21 are provided in the embodiment shown in FIG. 1 with small anti-friction wheels or rollers 25 which allow the two ends of the pivot arm 21 to roll freely along the upper surface 37 of the base 11. The upper surface 37 may be provided with a groove or track 27 along both the edges of the surface along which track 27 the anti-friction rolls or wheels 25 may be guided. It will be understood, however, that the groove or track 27 is not critical to the operation, since the angular construction and box configuration of the scissors arrangement will in most cases sufficiently guide the narrow rollers or wheels along the surface 37 without detrimental deviation of the rollers to the side.

A motor 29 of any suitable type such as an electric motor is mounted upon one end of the base 11 in a central position measured from side to side of the base. The motor 29 is attached to a rotatable screw rod means 31 threaded into an internally threaded fitting 33 mounted intermediate the ends of a spacer rod 35 extending between and attached to the ends of the scissors arm 21 between the anti-friction rollers 25. Upon rotary operation of the motor 29, the screw means 31 attached to the shaft of the armature of the motor is rotated causing the internally threaded fitting 33 to approach or recede from the motor 29 along the threaded rod 31 effectively moving the spacer rods 35 attached to the fitting 33 along the surface of the base and as a consequence, operating the scissors arrangement comprised of the two pivot arms 17 and 21. A wire 30 connects the motor 29 to a power source, not shown, and will be attached to suitable control means for reversing the polarity of the motor 29 so it may, upon demand, be operated in either direction.

Alternatively, any suitable transmission means with appropriate gearing to reverse the drive of the motor as described, as well as to provide speed variations, may be used.

Figure 3:
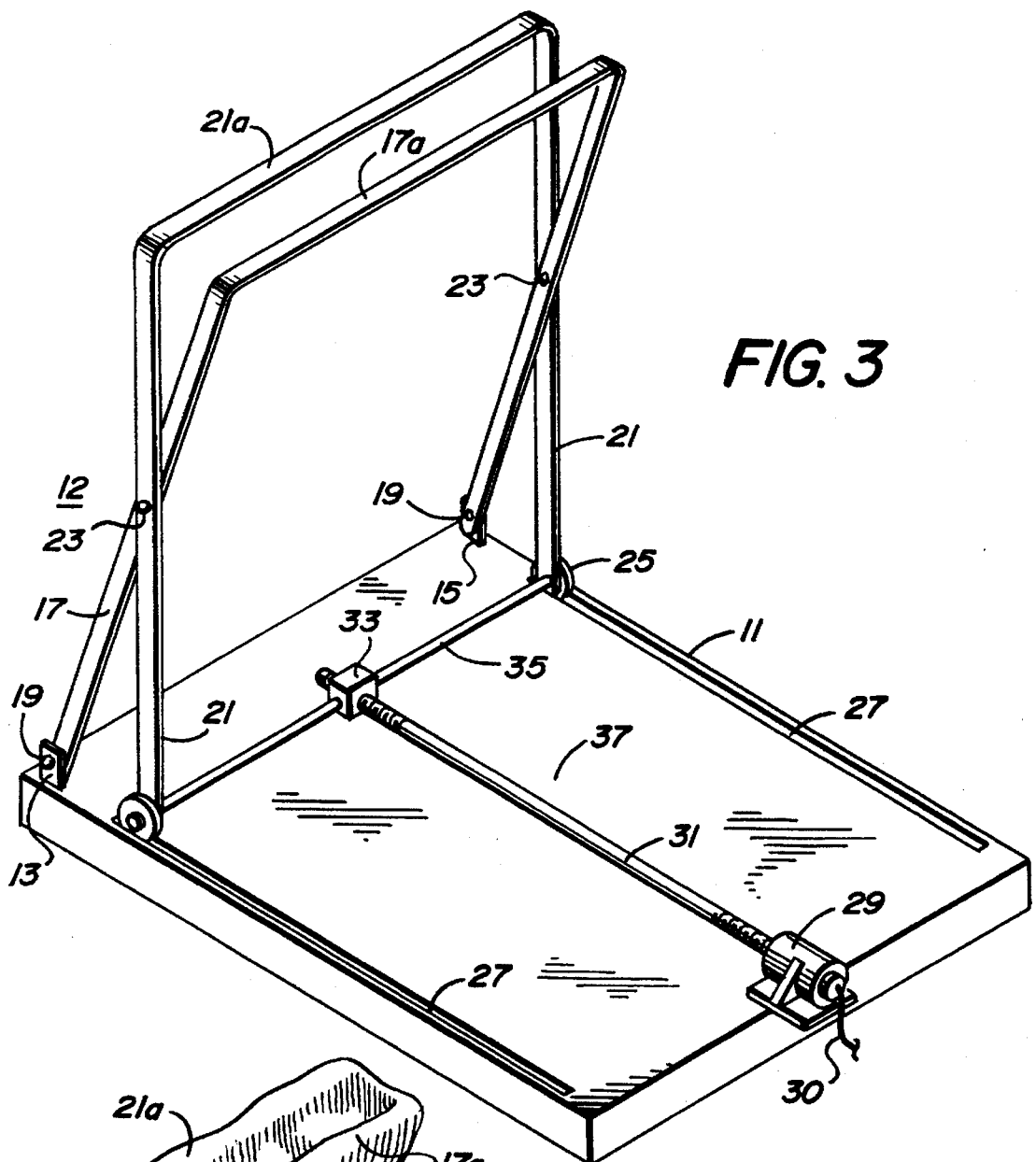
FIG. 3 is an isometric view of the embodiment shown in FIGS. 1 and 2 with the litter bag removed and the scissors arms extended upwardly in position for either receipt or removal of the litter bag from the scissors members or frame.
Figure 3A:
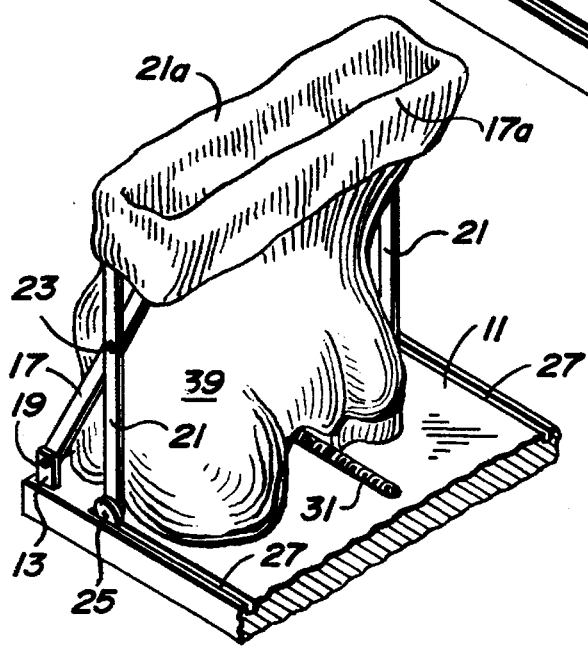
FIG. 3A is an isometric view of a portion of the embodiment of the invention shown in the FIGS. 1 through 3 in the same position as in FIG. 3 with a plastic bag-type container in place over the upper portions of the scissors arms and depending down between the arms.

It will be seen that as the screw rod 31 is rotated to bring the internally threaded fitting 33 toward the motor 29, the outer closed ends 17a and 21a of the scissors members or arms 17 and 21 are brought closer to the surface 37 of the base 11, while as the motor 29 is operated in the opposite direction and the threaded fitting 33 is moved away from the motor 29, the outer closed ends of the scissors members are raised upwardly from the surface as shown more particularly in FIG. 3. FIG. 3 shows the outer ends of the scissors members raised to a position over which a litter bag may be hooked or folded while such outer ends are relatively close together in position for either mounting the litter bag or removing it after use. FIG. 3A shows a portion of the apparatus with the scissors arms 17 and 21 erected and with a plastic bag-type litter container folded over the tops of the scissors arms. See also in this regard FIG. 13 hereinafter described.

Figure 2:
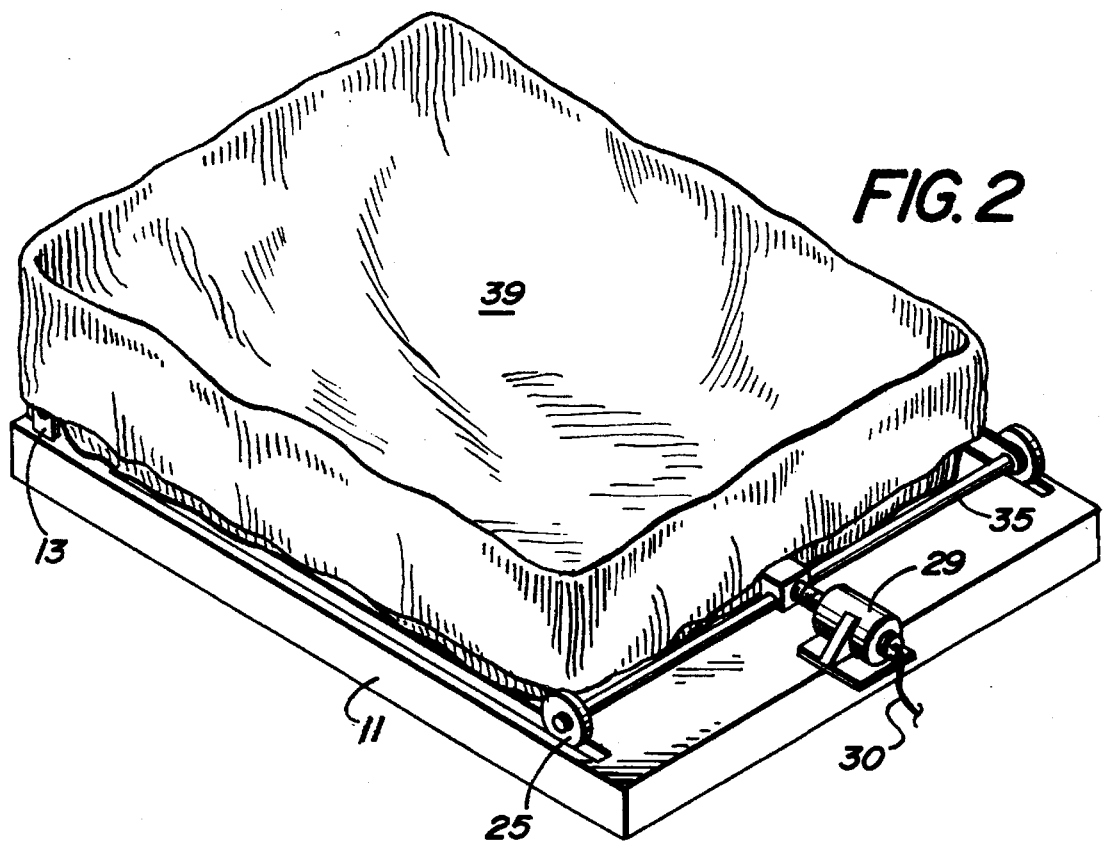
FIG. 2 is an isometric view of the embodiment shown in FIG. 1 in a partially-raised operative position from that shown in FIG. 1 with the litter bag in position for use by a cat or the like animal.

FIG. 2 shows the apparatus shown in FIGS. 1 and 3 in a partially raised position as compared to the fully retracted position shown in FIG. 1, with a litter bag 39 in the form of a garbage bag in position on the scissors members of the apparatus ready for the placement of granular litter material within the bag for animals to use. It will be noted that in FIG. 2 as well as FIGS. 1 and 3, no cat litter pan is shown, and in FIG. 2, the lower portion of the litter bag 39 rests directly upon the base 11. This is a very convenient arrangement of the apparatus and will be found to be quite acceptable to a cat using the litter within the bag as well as to the owner. However, it will be understood that a conventional litter pan may be inserted into the apparatus from the end opposite the motor 29 so the litter pan rests on the base 11 and the litter bag 39 rests within the litter pan. The use of a litter pan is shown with a somewhat different scissors apparatus in FIG. 7.

In the embodiment shown in FIGS. 1 through 3A, if a litter pan is used, such pan should be raised a little above the base 11 by inserting shallow blocks or spacers between the box and the base to allow for the threaded rod 31. Alternatively, a special litter pan having short legs to raise it above the threaded rod or a tunnel or groove in the bottom of the litter pan to accommodate the threaded rod should be used. It is also desirable, if a litter pan is not used, to place a curved plastic or metal shield, not shown, over the threaded rod 31 to prevent the plastic litter bag from contacting and possibly being damaged by said threaded rod.

FIG. 1 shows the scissors assembly 12 in a maximum retracted position with the outer end 17a of pivot arm 17 resting directly upon the threaded rod 31. However, it will be understood that the normal position of the scissors arms 17 and 21 for use will usually be not fully retracted, but more elevated in order to increase the height of the sides of the litter receptacle or container formed by the litter bag as supported by the framework supplied by the scissors assembly 12. See in this respect FIG. 2. In embodiments of the invention shown in subsequent figures stops may be provided on the scissors arms to hold them open at a correct position for use. However, with the screw arrangement in FIGS. 1 through 3A the assembly may be brought to any desired position. For example, the position shown in FIG. 1, while not desirable for litter bag support, does provide a minimum folded position for storage or transportation of the apparatus.

Figure 4:
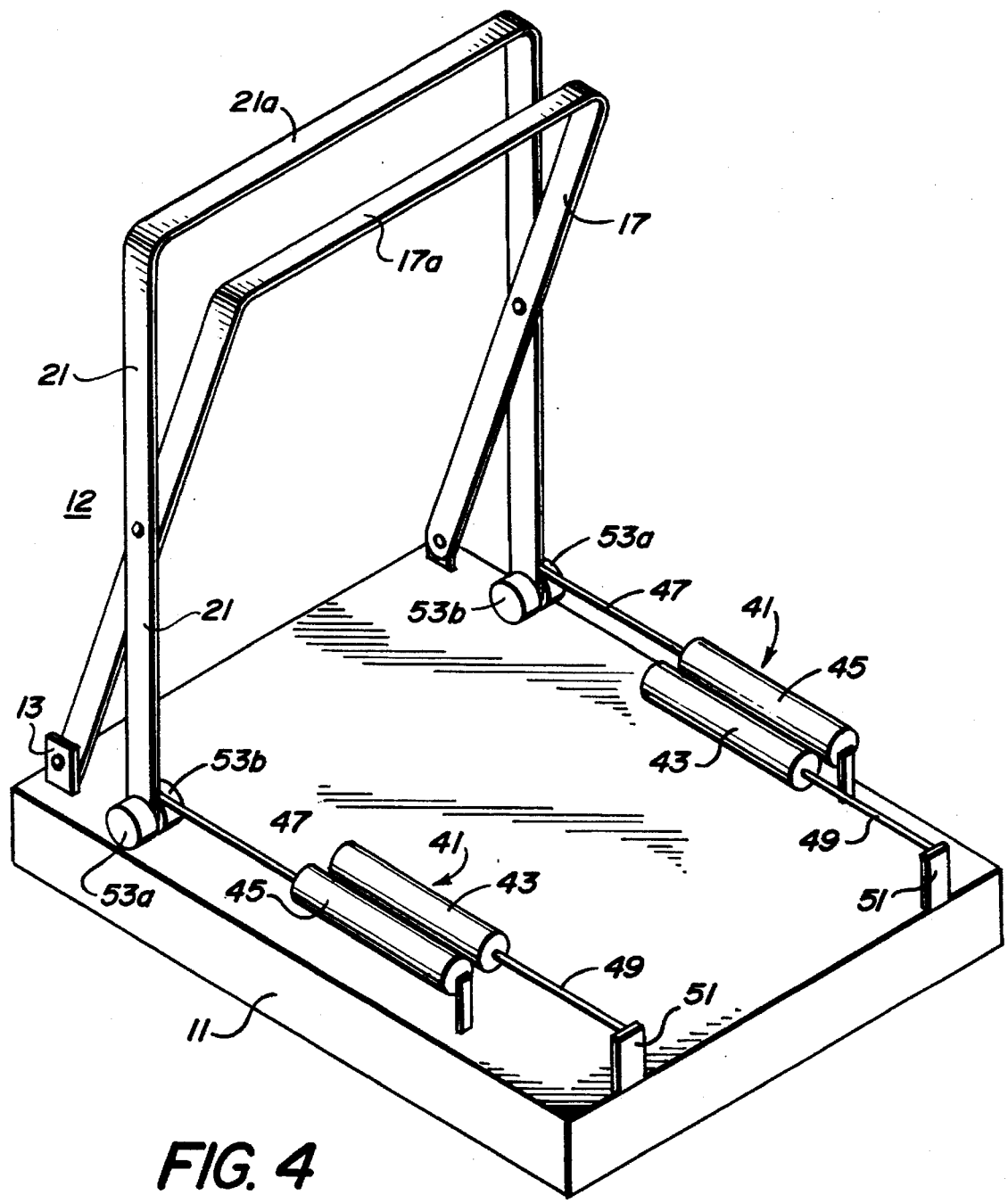
FIG. 4 is an isometric view of an alternative embodiment of the invention in which the scissors arms are powered by fluid pressure-type double cylinder means.

FIG. 4 shows an alternative embodiment of the invention in which the base and scissors members are substantially the same as in FIGS. 1 to 3, but in which the scissors movement is provided by a pair of double pistons and cylinders. In FIG. 4, the same structures are identified by the same reference numbers as in the previous figures. The power cylinders used with the embodiment of FIG. 4 are shown in the form of two double pneumatic or other fluid pressure cylinder units 41 that may be operated from a small air compressor such as the small units sometimes used to aerate large aquariums or the like. A hydraulic system can also be used. The cylinder units 41 are comprised each of two separate cylinders 43 and 45 attached back to back in opposite directions, respectively provided with pistons 49 and 47. The pistons 47 are attached at the outer end to the lower ends of the scissors arm 21, and the ends of the pistons 49 are attached to brackets 51 secured to the surface 37 of the base 11. The ends of the arm 21 of the scissors mechanism is also provided with an actual somewhat elongated anti-friction roller 53 which rolls freely along the surface 37 of the base 11. As shown in FIG. 4, the elongated anti-friction roller means 53 is actually comprised of two shorter rollers 53(a) and 53(b) journaled on opposite sides of the ends of the pivoting or scissors arm 21. The operation of the embodiment of the invention of FIG. 4 is otherwise the same as that of FIGS. 1 through 3.

Figure 5:
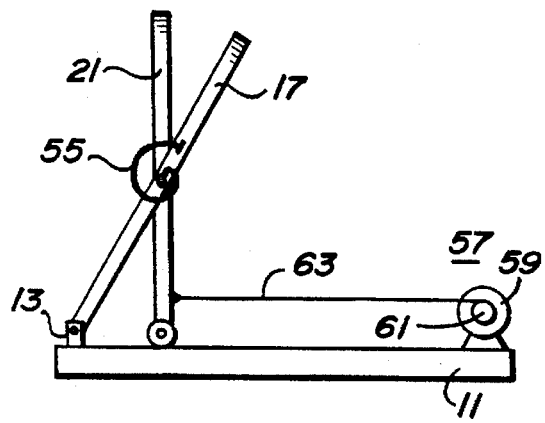
FIG. 5 is an elevation of a further alternative embodiment of the invention in which the scissors arms are powered by a spring arrangement and a powered pulley arrangement working in opposition.

FIG. 5 shows an elevation of a further version of the invention in which a partially coiled spring 55 serves to raise the scissors members or arms while a motor and pulley arrangement 57 is provided for lowering the scissors arms to use position. The motor and pulley arrangement include a motor 59 with a pulley 61 mounted upon the shaft of the motor, upon which pulley is coiled a line 63 attached to the lower portion of the movable end pivot arm 21. The motor pulley arrangement thus constitutes a small winch or capstan system. It will be understood that when the line 63 is tensioned or pulled, the scissors arms will be spread out or pulled down, while when the line is slackened, the spring 55 will urge the arms upwardly into bag dismount position.

Figure 6:
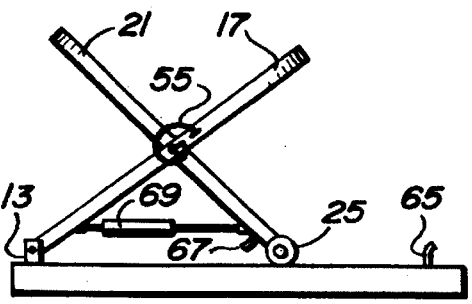
FIG. 6 is an elevation of a manually and potential energy operated embodiment of the invention incorporating a damping cylinder for preventing sudden movements that might propel material from the litter bag into the surrounding area.

FIG. 6 shows a somewhat similar manual operating arrangement in which a spring 55, similar to the spring in FIG. 5, serves to erect the scissors arms into bag mounting and dismounting position, while the device may be depressed manually into more or less lowered-use position. In FIG. 5, and in all subsequent figures, similar structures are identified by the same reference numerals as in FIGS. 1 through 3 and subsequent figures. A spring catch 65 is provided on base 11 for interengagement with a corresponding detent or catch 67 on the lower end of arm 21. A damping cylinder 69, which may be either a gas or fluid damping cylinder, is provided to slow down the action of the spring 55 in erecting the scissors members, which erection is initiated by releasing the spring catch 65. If the spring 55 was allowed to erect or fold the arms 17 and 21 unimpeded toward each other, litter and elimination material might well be thrown from the litter bag into the environment at the end of the movement as the result of the momentum accumulated during rapid closing.

Figure 7:
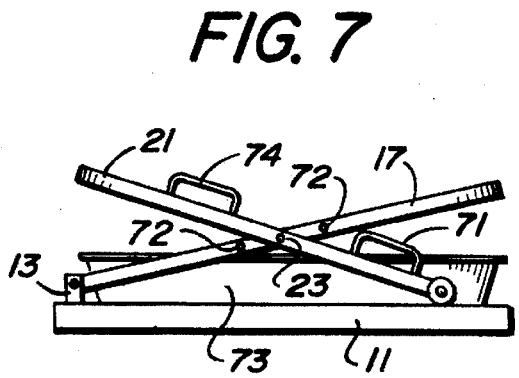
FIG. 7 is an elevation of a simple manually operated embodiment of the invention which also shows the use of a separate litter pan or container upon the base.

FIG. 7 is an elevation of a manually operated arrangement in which the operation of the device is effected by grasping a handle 71 or 74 on one of the arms 17 or 21, which in the instance shown, is the arm 21 where the handle provides better control. A cat litter pan 73 is also shown resting below the scissors apparatus in position to receive an animal litter bag, not shown, lowered into it by the scissors arms. A double pair of stops or detents 72 are shown mounted upon the pivot or scissors arm 17 on either side of the central pivot 23 in a position such that such stops or detents will not allow the two pivot arms to fold together beyond a critical point.

A minimum distance between the upper ends of the pivot arms 17 and 21, when erected, is necessary for convenient placement of a litter bag over the upper ends 17a and 21a of the erected pivot arms 17 and 21 with the main portion of the bag dependent between the horizontally elongated bag support sections of the pivot arms. See, for example, FIG. 11 hereinafter described. The stops or detents 72 will prevent the pivot arms from becoming coincident when erected with possible reversal of the arms and will also, when the pivot arms 17 and 21 are lowered near the base 11, maintain the two arms sufficiently above the surface to adequately support a litter bag above the surface. The stops 72 may comprise short stud pieces or screw elements extending from the side of the pivot arm 17 to prevent passage of the other pivot arm 21 into correspondence with the first pivot arm. It will be understood that the stops 72 could as well be mounted upon the opposite pivot arm and could take other forms. A double detent or stop is also usually unnecessary since a single stop will prevent the arms from moving into an undesirable overlapping position in either direction. However, the double detent or stop is preferred for safety and rigidity.

It is also convenient to provide a second handle 74 on pivot arm 21 as shown on the opposite side of pivot fastening 23. The handle 74 is in a position which may be more convenient for raising or erecting the scissors assembly 12. While in the elevation shown in FIG. 7, the handles 71 and 74 appear to be vertically mounted upon the arm 21, it should be understood that they will preferably extend somewhat transversely outwardly so as not to interfere with the scissors action of the assembly.

Figure 8:
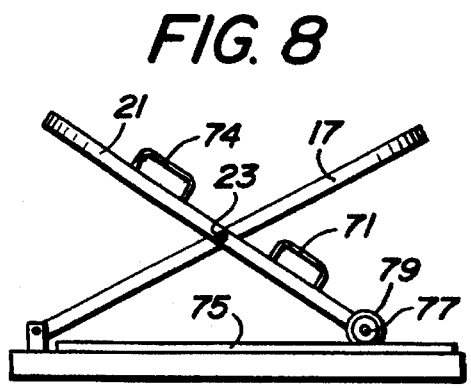
FIG. 8 is an elevation of an embodiment of the invention in which the lower free end of one scissors member runs upon an elevated track mounted upon the base rather than upon wheels or rollers running freely upon the base or in a groove in the base as shown in previous figures.

FIG. 8 is an elevation of a further example of the invention also shown manually operated conveniently by handles 71 and 74. In FIG. 8 there is provided a raised track 75 broadly similar to a railroad track mounted upon the top of the base 11. Upon each end of the arm 21 is a wheel 77 having a flange 79 which serves to retain the wheels 77 on the track 77 in a known manner. The track and flanged wheel arrangement provides a superior construction for maintaining alignment of the apparatus and reduces strain and the possibility of ultimate failure of the parts over a period, but is not strictly necessary.

Figure 9:
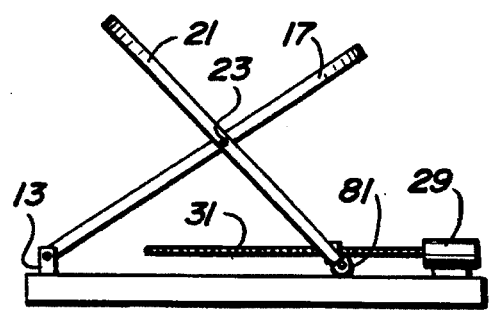
FIG. 9 is an elevation of an alternative manual embodiment of the invention similar to the embodiment of FIGS. 1 through 3, but in which the lower end of the moving scissors arm section is provided only with a friction-reducing shape and/or surface coating.

FIG. 9 shows an arrangement basically similar to that shown in FIGS. 1 through 3, but in which the anti-friction means at the bottom of the arms 21 is, instead of being comprised of rotating wheels or rollers, a smoothed anti-friction surface which is shown in the figure as a type of curved, anti-friction saddle 81 which slides on the surface 37 of the base 11. The saddle 81 may be pivoting to maintain a preferred orientation with take surface in all positions of the pivot arms.

Figure 10:
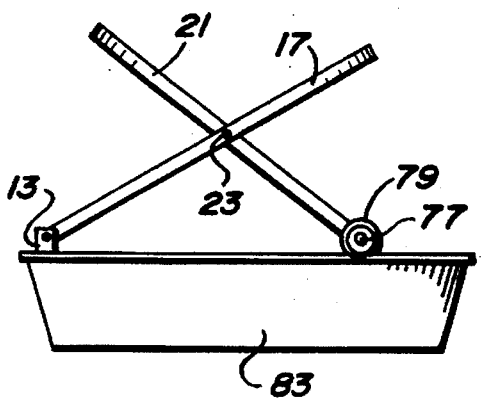
FIG. 10 is an elevation of an alternative embodiment of the invention in which the scissors means are mounted directly upon a litter box which serves as the base.

FIG. 10 shows an alternative embodiment of the invention in which the base 11, instead of being comprised of a flat rectangular base as shown in the preceding figures, is an actual cat litter pan 83 to which the scissors arrangement of the invention is secured by the brackets 13 and 15 (only bracket 13 being visible) similar to the brackets shown in preceding drawings. A wheel, which may be a flanged wheel 77 such as shown in FIG. 8, is provided on the ends of scissors arms 21 to move or roll along the side of the pan. Alternatively, a roller-type anti-friction means may be arranged to roll along the top edge of the litter pan. As a still further embodiment, an upwardly opening channel member, not shown, could be provided in which an anti-friction wheel may move in a manner similar to the wheel-and-groove arrangement shown in FIGS. 1 and 3. In such arrangement, the pivoted arm 17 could be pivoted between the two upwardly extending flanges of the channels rather than to a separate fitting such as the brackets 13 and 15 shown in the various other figures. The pivot pin 19 illustrated in the other figures would, in such case, be passed between the two flanges and through the bottom of the pivot arm to allow pivoting of such pivot arm.

FIG. 11 shows in elevation, a further embodiment of the invention in which there are two rollers on each of the free ends of the scissors arm 21. The upper roller 83, which is horizontally disposed, is arranged to roll along the top side edge of a litter pan 73 which pan is supported upon the base 11, while the lower roller 85 passes along the side of the litter pan 73 below and in roller contact with a lip 73a at the top of the litter pan. This arrangement provides a superior stabilization of the ends of the arm 21 during movement. A bracket 13, as in the other figures, stabilizes the fixed end of the scissors arm 17 upon the base 11. Consequently, in FIG. 11, the scissors arm assembly 12 is attached at one end to the base and stabilized at the other end to a litter pan positioned upon the base. The arrangement is convenient, but could, with somewhat less convenience, be reversed. The roller 85 is shown horizontally journaled, but could, it will be understood, be substantially vertically journaled so such roller physically rolls along the side of the cat pan.

FIG. 12 is an isometric view of an arrangement of the invention in which the scissors arms 17 and 21, which are shown as a purely mechanical arrangement for manual activation, are secured to the base 11 along the long direction of the base rather than transverse to the long direction of the base. A cat litter retainer 87 in the form of a shallow depression is provided in the top of the base. It will be understood that this requires that the base 11 have sufficient thickness to accommodate the depression of the cat litter retainer 87. The depression 87 allows the pivot arms 17 and 21 of the scissors assembly 12 to lie at a lower angle upon the base and still provide a desirable depth to the container formed by the litter bag when the apparatus is placed in use position or configuration. A finger orifice 88 is provided in the side of the base 11 under the arm 21 to allow convenient gripping of the end 21a of pivot arm 21 for elevation of the pivot assembly which, in use position, normally lies directly upon the top of the base.

FIGS. 13 and 14 respectively show elevations of a manually operated scissors arrangement similar to that shown in FIG. 7 in which a cat litter bag 39 is shown placed in supported position in FIG. 13 and is shown in use position in FIG. 14. In FIG. 14 the upper outer portion of the cat litter bag 39 is seen to basically envelop the outside of the entire apparatus when positioned for use. In order to render the drawing more meaningful, the lowered scissors arms 17 and 21 are shown in outline form through the outer litter bag as well as the animal litter pan 73, the top edge of which is shown positioned just below the upper extent of the scissors arms 17 and 21 which extend between the top of the litter pan 73 and the inside top of the litter bag 39. Since many litter and garbage bags are formed from fairly thin plastic material, the structural members of the assembly may frequently be seen basically through the plastic in any event.

Figure 16:
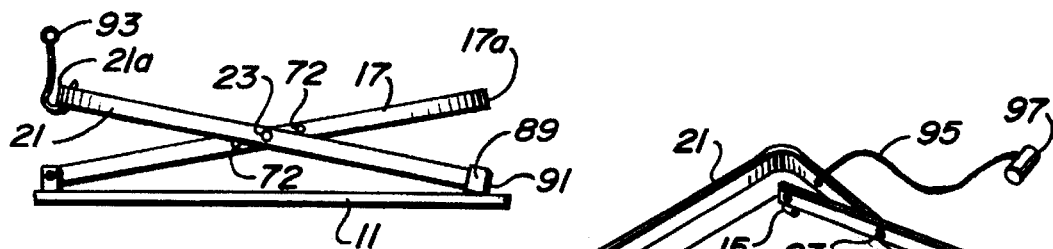
FIG. 16 is an elevation of the apparatus of FIGS. 15 with the frame in use position and also showing a hook used for raising or lowering the scissors action arrangement.
Figure 17:
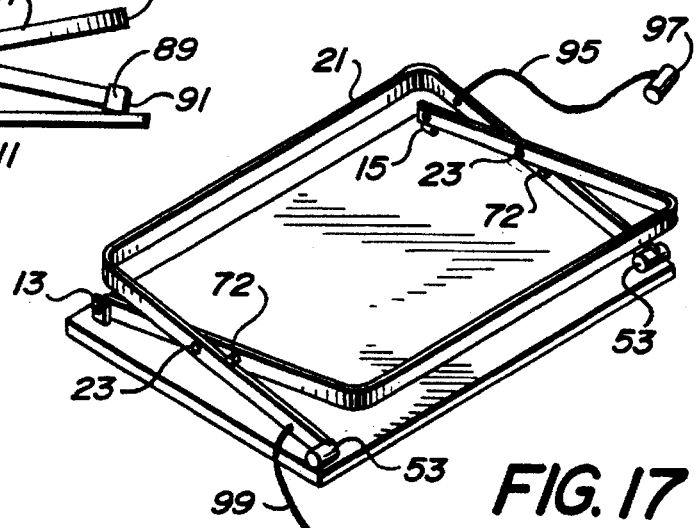
FIG. 17 is an isometric view of the apparatus of FIG. 15 and 16 with additional line-type manual operating means provided for moving the scissors arms and with a different anti-friction arrangement on the movable scissors arms.

A practical, inexpensive commercial version of the apparatus of the invention is shown in FIGS. 15, 16 and 17, FIG. 17 showing a somewhat modified version of the apparatus. FIGS. 15 and 16 are respective side elevations of the apparatus in an initial partially erected configuration in FIG. 15, and in a use configuration in FIG. 16. It will be noted that the base 11 in FIGS. 15 and 16 is relatively thin. Such base may be constructed of any stiff, strong material such as plastic or hard composition board or even light metal. The brackets 13 and 15 are secured to the top of the base at one end by suitable bolt or screw-type fastenings, not shown, passing through the base and the pivot arm 17 is attached thereto by a pivot fastening 19 as in previous embodiments. The free end of the pivot arm 21 is provided with a plastic or rubber composition cap or boot 89 having a bottom section with a substantially flat end configuration 91 having an angle with respect to the longitudinal extent of the arm such that when the two pivot arms or scissors arms 17 and 21 are erected, the flat section 19 rests entirely in contact with the surface 37 of the base 11.

It will be noted also, as shown, particularly in FIG. 17, that the scissors arms 17 and 21 are oriented with the base in the long direction similar to the arrangement shown also in FIG. 12. This has been found to be desirable in a strictly manually-erected apparatus as it limits the distance that the scissors arms are required to be moved from full erection to use configuration and back again. On the other hand, when some power means is used to effect or change the orientation of the scissors arms with respect to each other and the base, it may be convenient to orient the scissors arms with the lesser dimension of the base, because additional length thus attained in the base is desirable for placement of the power means as in FIGS. 1 through 5. Convenient dimensions for the base are approximately 16 by 20 to 24 inches. However, it will be evident that the actual dimensions may be varied to provide whatever size litter apparatus is desired.

Various aids to erection of the apparatus preparatory to removing a used litter bag and replacement with a fresh litter bag may be used. For example, a hand-held-type hook 93 shown in FIG. 16 engaged with the outer end 21a of the pivot arm 21 may be used to erect the apparatus. Upward tension by the hook 93 upon the end of pivot arm 21 will readily erect the scissors apparatus 12 from a use mode into erected mode. On the other hand, after a new or replacement litter bag is folded over the outer ends 17a and 21a of the scissors arms 17 and 21 of the scissors assembly 12, the hook 93 may be hooked around one of the legs or free ends of the pivot or scissors arm 21 and used to urge such arm along the surface of the base so that the scissors arrangement opens out to place the apparatus in use mode as shown in FIG. 16. Alternatively, the scissors assembly may be merely pushed down into use position manually.

As explained in connection with FIG. 7, the stops 72 prevent the pivot arms 17 and 21 from becoming parallel to each other or even crossing when erected so that they cannot be readily returned to use configuration. It also provides a space between the upper ends of the pivot arms necessary for convenient placement of a litter bag over the outer ends 17a and 21a of the arms with the main portion of such litter bag dependent between the two pivot arms of the scissors assembly 12. The stops also prevent the pivot arms 17 and 21, when they are in use configuration, from lying at too small an angle with respect to each other. If the arms become too parallel with respect to each other and the base, they would not support the litter bag sufficiently above the surface of the base to constitute an effective receptacle for animal litter. The sides of the receptacle formed by the litter bag should be ordinarily about 4 to 6 inches in height as defined by the top edge of the pivot arms 17 and 21 when arranged in use configuration. While straight pivot arms are shown in each of the figures herein for convenience, the pivot arms may also be curved or bent in various manners, for example, to provide more side support in the center of the device in use position, and a different angle of the upper portion in erected position.

As shown in FIGS. 15 and 16 and the other embodiments shown in preceding figures, the pivot arms 17 and 21 may conveniently be formed from flat metal stock, such as carbon steel stock, approximately one eighth of an inch thick and three-quarters of an inch wide. This provides a sturdy yet light framework that will withstand considerable abuse, yet remain rigid and easily supportive of fairly large cats and the like animals. Cats will show a tendency to step directly on the sides in entering and exiting from the litter receptacle when arranged in use configuration, so the scissors framework forming the scissors assembly 12 should be fairly strong. However, other materials such as aluminum, various plastics and other material may also be used as construction materials.

FIG. 17 is an isometric view obliquely from the top of the litter receptacle of FIGS. 15 and 16 arranged in use mode and shows that the pivot arm configuration is lengthwise of the base as in FIG. 12. Since, however, the base has very little thickness, perhaps one quarter inch of stiff plastic material or hard board material, there is no depression in the middle of the base as in FIG. 12 to gain additional depth for the litter bag. In the embodiment of the litter apparatus shown in FIGS. 15, 16 and 17, a conventional litter pan may be inserted or placed upon the base 11 to serve as an additional spill guard in case the litter bag should rupture. However, the use of the litter pan is solely optional and none is shown in FIGS. 15, 16 or 17.

FIG. 17 further shows an additional handling device in the form of a short line 95 with a handle 97 which in use configuration would extend from under the litter bag, not shown. It will be understood that the short line 95 is secured to the pivot arm 21 slightly above the pivot fastening at the intersection of the two scissors arms and serves when tensioned upwardly by grasping the handle 97 to draw the two scissors arms upwardly, while allowing the pivot or scissors arm 21 to move both upwardly and inwardly along the surface 37 of the base 11 until the apparatus reaches a fully erected configuration, at which point a litter bag may be inserted between the outer cross pieces or outer ends, 17a and 21a of the pivot arms and the top of the bag folded over each cross piece for three or four inches. The pivot arm 21 may then be drawn toward the outside of the base by a second line 99 with a handle 101, the other end of the line 99 being attached to a lower free portion of the pivot arm 21 as shown in FIG. 17 on the opposite side of the pivot arm. It will be noted that the scissors arms 21 in FIG. 17 are provided with anti-friction rollers 53 rather than the anti-friction plastic caps 89 shown in FIGS. 15 and 16. This provides a somewhat smoother operation with the dual line handling system also shown in FIG. 17.

As will be evident from the foregoing, the method of using and/or providing litter facilities for cats and other animals in accordance with one aspect of this invention is as follows: (a) an adjustable apparatus having at least two elongated erectable bag edge supports is provided in the vicinity in which the cat or other animal is to be encouraged to use a litter receptacle for elimination purposes, (b) the edge supports are erected or turned upwardly with respect to a support or base upon which such edge supports are movably supported, (c) a plastic bag or sack-shaped member is brought into the vicinity of the edge support members and the edge of the plastic bag is folded over the tops of the two elongated edge bag supports and the main body of the bag is allowed to depend between the edge supports, or, alternatively, a bag having a prefolded and secured upper portion, (d) the edge supports are next moved outwardly and downwardly spreading the top of the bag into a substantially opened position and allowing the bottom of the bag to rest either upon the base, a depression in the base or upon a litter pan either upon the base or constituting the base itself, and (e) litter material is then placed in the bag for use by the animal.

When the litter material has become sufficiently soiled so it can no longer be considered sanitary or is otherwise offensive to the cat or the owner, the two elongated edge support means are again moved upwardly and inwardly to bring the top edges of the bag closer to each other and incidentally to release the tension in the bag so it can be easily removed from the top of the two elongated edge bag supports. A tie or closure of any suitable type is then used to close the top of the bag for disposal in any convenient and environmentally acceptable manner and a replacement bag is re-applied or mounted upon the elongated bag support edges and the cycle is repeated.

It will be readily recognized that the method and apparatus of the invention is both convenient and effective in facilitating the handling of litter for animals and is especially attractive for such handling by elderly or partially disabled persons who may frequently have difficulty in servicing their pet's litter facilities.

One attractive variation of the above described method of operation is to prefill the bag with litter material prior to mounting the bag on the elongated bag support edges, of the pivot arms. Such prefilling can be either just prior to use or alternatively suitable bags may be prefilled with litter before use or even before they are purchased. Such bags can even be supplied in ready-to-use-packs sold as ready-to-use litter. This expedient effectively eliminates the fuss and bother normally involved in filling the bag with animal litter including the dust generated in the usual operation of pouring litter material into the plastic litter bag either before mounting upon the apparatus of the invention or after the plastic bag is spread out by the apparatus of the invention. Packs of several already-filled ready-to-use litter bags can be sold together and opened and used separately as required with a minimum of handling, dust and dirt. While the usual animal litter bag is not ideally suited for prefilling with litter before placement in a litter pan because of its shallow configuration, the scissors arm apparatus of the invention renders such prefilling practical and useful, since the usual deeper garbage bags can be conveniently used and are easily prefilled and temporarily secured or closed until actually mounted upon the apparatus of the invention. In fact, the use of a garbage bag or at least a specially made extra deep litter bag is preferred as it is usually desirable for the bottom of the bag to remain supported upon the base of the scissors apparatus when the top is erected with the arms and tied or otherwise secured after use. This prevents any chance of the top of the litter bag being pulled by the weight of the litter from over the cross pieces of the scissors arms prior to the top of the bag being secured by any suitable tie means. When using a relatively shallow litter bag such as frequently supplied for use in conventional cat litter pans, it may be desirable to physically secure the top of the litter bag after folding over the tops of the pivot arms with a suitable clip such as a conventional clothes pin or the like to prevent premature separation of the folded top of the bag from the pivot arms, if the bottom of the litter containing bag is lifted from supported position upon the base or effective base of the apparatus of the invention. A better solution, however, is to use a deeper bag.

Figure 18:
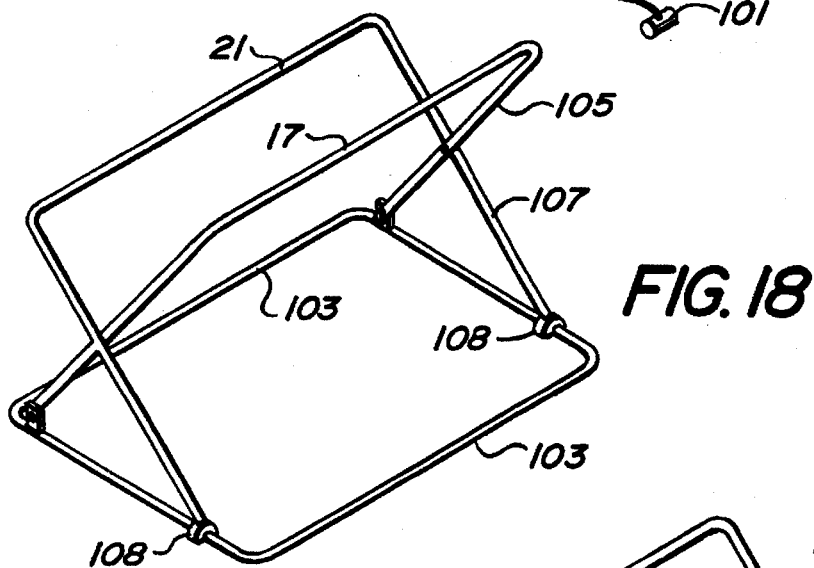
FIG. 18 is an isometric view of a further embodiment of the invention making use of a tubular ring-type base open in the center.

While each of the embodiments described so far include a base upon which the bottom of the litter bag rests during use either directly or indirectly, such arrangement is not mandatory. One useful variation of such an arrangement is shown in FIG. 18, which is an isometric view of a still further alternative embodiment of the invention in which the base 11 is comprised of a tubular frame base 103 having an open or hollow center into which the bottom of the litter bag extends while resting directly upon the surface upon which the apparatus as a whole rests. It will be seen also that the embodiment of FIG. 18 has not only a tubular outer base, but that the pivot arms 17 and 21 are also tubular in construction, being formed from tubular sections 105 and 107 formed from metal or strong plastic tubing. The remainder of the apparatus shown in FIG. 18 is essentially the same as in the previous drawings except that the anti-friction means at the end of the pivot arms 21 are shown in the form of pivoted saddles 105 which slide upon the tubular base 103. The saddles may have an anti-friction coating on the inside of the curved saddles 108 to facilitate movement along the tubular base.

Figure 19:
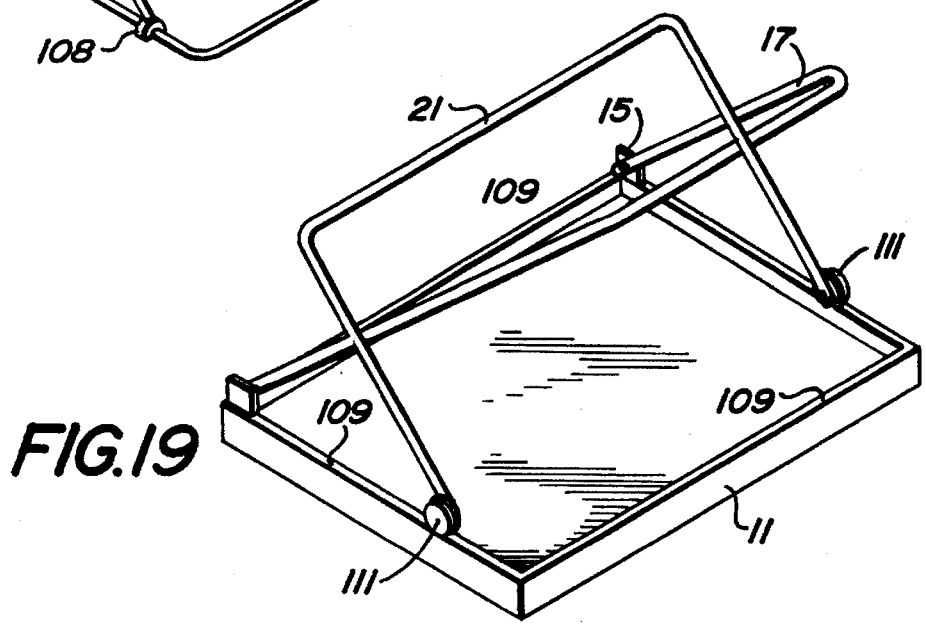
FIG. 19 is an isometric view of an alternative embodiment of the invention incorporating a litter-retaining lip around the exterior of the base.

FIG. 19 is an isometric view of a still further embodiment of the invention in which a litter apparatus otherwise fairly similar to the apparatus shown in previous figures is provided with an outer rim 109 provided completely around the base 11. The rim 109 can be very convenient in containing or confining any litter material which may spill from the litter bag or which in particular escapes from a ruptured litter bag, which may occasionally be ripped or perforated by a cat's claws during digging into the contained litter material. As will be understood, at such times the rim or edge 109 around the base will be highly convenient in retaining the litter material and confining it to the base itself where it can be conveniently removed by pouring out or brushing away with a dust brush and pan rather than escaping to the environment such as onto the rugs of a house and the like. In FIG. 19 an anti-friction means in the form of flanged wheels 111 are mounted upon the low upturned edge 109 which serves somewhat as a track similar to the track shown in FIG. 8 and the flanged wheel is similar to the flanged wheel 77 shown in FIG. 8 running on a track as well as the similar wheel shown in FIG. 10 operating on the side of a cat litter box or pan.

FIG. 20 is an isometric view of a further type of pivoted arm base for use in accordance with the invention in which the pivoted arms 121 and 123 are each pivoted to a base 11 at intermediate points 125 and 127 so that they may be raised toward each other to be inserted into folded over or preferably, outer pockets of a cat litter bag which is preferably, but not necessarily, prefilled with cat litter. The pivoted arms 121 and 123 can then be lowered until they are almost but not quite parallel to the base as shown in FIG. 22 supporting the cat litter bag in a position for use by a feline. As will be noted, the pivoted arms are not arranged in a scissors arrangement, but are each secured at their pivot points 125 and 127 directly to the base 11.

Preferably the upper cross arm portions 129 and 131 of each of the pivot arms 121 and 123 respectively are constructed in a flat configuration and arranged at such an angle that when the two arms are pivoted toward each other and pressed together, the flat surfaces or clamping surfaces 133 and 135 on the cross arms 129 and 131 are brought parallel to each other and press the tops of a bag inserted in or supported upon the ends of the pivot arms together. This is shown in FIG. 21 where the top of the bag can be seen clamped together by the tops of the pivoted arms. Each side of each of the pivoted arms 121 and 123 are provided with supporting legs 137 which serve when the arms are in their outer pivoted or use orientations, to support the arms at a predetermined distance from the base 11 sufficient to hold the arms at a desirable height from the base to support the sides of a cat litter bag. Crank means 139 and 141 are also provided on one side of the base 11 connected to the ends of the arms 121 and 123 respectively in line with the pivoting of such arms. Such crank means 139 and 141 provide means for independently operating each of the pivoted arms 121 and 123. However, as shown in FIGS. 20 and 21 particularly, the two arms 121 and 123 may also be mechanically interconnected by suitable means such as a crossed sprocket belt or chain 143 engaged with sprocket gear wheels 145 and 147 so that movement or rotation of either of the pivoted arms 121 or 123 will cause the other arm to describe a similar movement. When the two arms are tied together in this manner, only one of the cranks 139 or 141 need be present. It will be understood that other mechanical arrangements causing the arms to rotate either in unison or coordination or separately may also be used, the mechanical means illustrated being merely one convenient arrangement.

In operation of the device, when it is desired to place a cat litter bag over the pivoted arms 121 and 123 one or both of the cranks 139 and 141 will be grasp and turned to bring the cross arms 129 and 131 to an upward position where a cat litter bag may be folded over the ends. The ends of the lever arms 121 and 123 are then brought outwardly as in previous embodiments until such arms spread out the litter bag ready for use as shown in FIG. 22.

The embodiment of the apparatus shown in FIGS. 20 and 21, like the previous embodiments, may be used with a prefilled cat litter bag which is purchased already filled or pre-packaged and then opened in the apparatus. After use the pivoted arms of the apparatus are brought together and the bag secured at the top prior to disposal.

While the apparatus as described can be used with any suitable plastic bag either prefilled or prepackaged or not, it is preferred to use a prepackaged arrangement in which the top of the bag is permanently turned over or cuffed to provide pockets for the upper ends of the arms of the apparatus. The prefilled bag is in such an arrangement heat sealed or otherwise sealed along a line between the cuffed sections and may be provided between the cuffed sections on the inside of the bag with an adhesive restricted to an area shielded with a removable tape. After removal of the shielding tape, the adhesive is used in order to seal the top of the litter bag after use. In such case, the flat surfaces 133 and 135 of the cross bars 129 and 131 are arranged or oriented so that when the pivoted arms are rotated toward each other after the protective tape is removed from the adhesive sections, the flat sections of the support apparatus come together over the adhesive sections clamping them together and causing the two sides of the bag to adhere, after which the bag can be removed from the arms and disposed of with its load of feline waste mixed in with the cat litter. The cat litter bag can also preferably be provided with a double pleat on the top with the dimensions of the apparatus and bag being such that when the bag is first mounted upon the partially open arms the pleat is retained as the arms are lowered into use position and the lower portion of the bag rests upon the base. As the arms 121 and 123 are brought upwardly after use, however, at their highest point of travel or the top of the arc described by the upper ends of the arms, such arms tend to raise the bag from the base and the inner pleat or fold will give way and the bag will settle because of the litter material within it. If the adhesive material has been positioned therefore on the outside of the inner pleat or fold, such adhesive material will now be drawn into the inner portion of the bag and if the protective tape has in the meantime been removed from the adhesive, the continued movement of the cross pieces or cross arms 129 and 131 toward each other will bring the flat faces 133 and 135 of the pivoted arms against the outside of the bag over adhesive sections now on the inside of the litter bag and the two sides of the bag will be securely adhered to each other ready for disposal by clamping the adhesive sections together.

As will be evident, the described arrangement for sealing the bag can be used not only with prefilled or prepackaged cat litter bags but also with bags filled after erection upon the apparatus since the subsequent operation will be essentially the same. However, it is convenient for the user if the bags are supplied prefilled, since this removes the inconvenient and dirty, particularly dusty, steps of pouring the litter material into the opened litter receptacle, either in a litter pan or supported directly upon the base of the apparatus.

It is also convenient and practical to make the bottom of the litter bag of a heavier material than the sides so that a cat digging in the litter will not catch its claws in the plastic material, ripping it and releasing the litter material.

In addition, it has been found very effective in preventing dusting of the material caused possibly by handling of the bag in setting it up if the top of the litter in the bag is temporarily covered with a protective layer. Such layer need be only very thin and can be desirably in the form of a paper or the like sheet having the consistency of not much more than a thin filter paper or tissue paper sufficient to prevent dust from being raised from the surface during vibration and the like. Such thin paper protective film or sheet can be easily pierced by the cat and torn away by the cats claws. To increase the likelihood of the cat tearing and removing the protective film when using the litter pan, a thin layer of litter material or litter-type material may be permanently adhered to the surface of such material. One or two scratches of the cat will be sufficient to disrupt the thin film and the remnants are insufficient to interfere at all with the cat burying its leavings. The diaphenous or thin film over the litter material to retain it and generally prevent dusting from the surface during handling is particularly important and convenient in larger and flatter litter bags. For example, if a litter bag is designed for a particular type of wide pan, the surface of the litter may be relatively extensive and the dusting prevention film may assume relatively greater importance.

FIG. 23 is an isometric view of a typical litter bag in accordance with the invention viewed from above as supplied presealed. The bag 161 has a generally rectangular conformation with a sealed opening 163 at the top and a permanent pocket or folded-over section 165 around the edges. Preferably, this section has a double pleat or fold with the outer section being supplied with an adhesive deposit 167 disposed on the outside and a protective paper tape or the like provided upon the outside. This is shown in FIG. 24 in cross section. When mounting the litter bag on a support apparatus as shown in FIGS. 20 and 21, the upper portions of the arms are mounted upon the tops of the pivoting arms of the apparatus and the arms are then moved outwardly, which results in tearing open the bag along the sealed opening 163 as shown in FIG. 23 preparing the bag for use. When the apparatus is then operated to open the bag wide and then operated to close the bag, the inner pleats are pulled or stretched out so the adhesive ends upon the inside of the bag and the apparatus then presses on the top of the bag over the adhesive, sealing the top.

As shown in FIG. 25, the bottom of the bag is preferably formed of a reinforced or thicker plastic material forming a reinforced bottom 171 to prevent a cat's claws from piercing the bottom when digging. FIG. 23 shows a portion of a protective sheet 173 inside the bag which prevents dusting of the surface of the litter material during handling and prior to use. This is shown in FIG. 24 as a thin, solid film 173 over litter material 174.

It will be understood that the prefilled bag can not only be used in the apparatus shown, but could also be used by itself by placing in an ordinary litter pan. It is also, because of the preferred collar or pleat around the top forming pockets into which the pivoted arms of the apparatus can be fitted, adapted to be supported by a support rack such as shown in FIG. 25 where upwardly extending stationary supports 175 are mounted upon a base 11 and the bag may be placed over these support arms with the tops of such support arms inserted into the pockets behind the folded over pleat section 165 of the litter bag. FIG. 25 shows supports only at the ends of the apparatus, but since the pockets, preferably, but not necessarily, extend completely about the bag, such supports could also be on the side.

It will be understood also that while the prefilled litter bag has been illustrated with several desirable features, the bag may incorporate less than all of such features. It is necessary, however, that the bag be originally sealed in some satisfactory manner and be sealable in some satisfactory manner after use and also that it be formed of some plastic material having a sufficient gage and strength to contain the litter material within it. It is also desirable that the litter bag be of a generally geometrical configuration that can be conveniently packed together with other prefilled bags as shown, for example, in FIG. 26 where several such bags 161 are packed together into an overall package 177 having a pair of handles 179 for convenient carrying.

It will be recognized from the above description and discussion that the present invention provides a novel and useful apparatus and method for at least partially mechanizing the handling of cat litter which is particularly useful for aiding young, elderly or disabled persons in caring for their cats. The device, which has a number of possible embodiments, considerably facilitates the handling of litter both fresh and soiled, and also makes it practical to use fairly deep plastic bags such as garbage bags as litter containers with advantages that have been described in some detail above.

While the present invention has been described at some length and with some particularity with respect to several described embodiments, it is not intended that it should be limited to any such particulars or embodiments or any particular embodiment, but is to be construed broadly with reference to the appended claims so as to provide the broadest possible interpretation of such claims in view of the prior art and therefore to effectively encompass the intended scope of the invention.

I claim:

1. A sanitary collection and disposal apparatus for animal litter comprising:
   (a) an effective base having an upper surface for receipt and firm bottom support of a flexible animal litter, receptacle,
   (b) at least two cooperating animal litter receptacle support arms, both of which arms are pivotally attached to the base at one end of such support arms and having outer sections extending away from the pivoted ends and terminating in outer ends and which are coordinated for movement of their outer ends synchronously toward and away from each other,
   (c) said support arms having substantially equal lengths and being pivoted to a central portion of the base at positions adjacent to, but spaced from, each other which allows the outer ends of the support arms to approach and contact each other at one extreme of their normal movement and to approach within a few inches of the base at the other extreme of their movement, said pivot position being spaced upon the base between the ends of a litter pan supported upon the base, and from each other,
   (d) litter receptacle support surfaces at the outer ends of said coordinated litter receptacle support arms over which upper portions of flexible litter receptacles may be folded and supported and
   (e) the lengths of said support arms being such as to position the outer ends of such support arms adjacent to the ends of the effective base when the arms are supporting a flexible litter receptacles in use configuration engaged with the sides of a flexible animal litter receptacle in open position.

2. A sanitary collection and disposal apparatus in accordance with claim 1 wherein support surfaces at the outer ends of the coordinated flexible receptacle litter support arms include flat interengaging surfaces disposed to come into face-to-face contact for pressing together and adhering opposite plastic portions of a flexible litter receptacle to each other through an adhesive.

3. A sanitary collection and disposal apparatus in accordance with claim 2 wherein the base is oblong in configuration and designed to support a flexible litter receptacle when in use position, and the flexible litter receptacle support surfaces comprise elongated support surfaces.

4. A sanitary collection and disposal apparatus in accordance with claim 3 wherein the oblong base includes a litter receptacle support surface and the flexible litter receptacle support surfaces comprise extensions between the two litter receptacle support arms.

5. A sanitary collection and disposal apparatus in accordance with claim 4 including support means mounted upon the apparatus to prevent the support arms from extending in use configuration beyond a point where the sides of the flexible litter receptacle are maintained at least several inches from the base.

6. A sanitary collection and disposal apparatus in accordance with claim 5 wherein there is a rigid animal litter receptacle interposed between the base and the flexible litter receptacle.

7. A sanitary collection and disposal apparatus in accordance with claim 4 wherein the support arms are pivoted upon the base at positions such that the upper portions of the support arms have a somewhat lower elevation at their interengaging position than at their highest elevation.

8. A handling apparatus for a flexible disposable animal litter receptacles comprising:
   (a) a base having a top surface arranged and constructed to support a flexible disposable animal litter receptacle in an open position with litter within it for an animal to dig in to bury its waste,
   (b) two pairs of receptacle support arms pivoted upon the base at a central location,
   (c) said pairs of support arms being pivotable toward and away from each other in a coordinated manner so that the outer ends substantially come into contact above the center of the base in raised position when the litter receptacle is substantially closed and approach the ends of the base when the litter receptacle is open in use position, (d) the position of the ends of the support arms when in open use position being retained several inches from the base dependent upon the desired height of the sides of the animal litter receptacle above the base, but in any event at a distance allowing an animal which is to use the receptacle to conveniently step over the sides of such receptacle.

9. A handling apparatus in accordance with claim 8 wherein the base supports a rigid animal litter apparatus between the base and the flexible animal litter apparatus.

10. A handling apparatus in accordance with claim 8 wherein the two arms of each pair are connected to each other at the outer end and incorporate receptacle support sections.

11. A handling apparatus in accordance with claim 8, wherein the receptacle support sections have flat surfaces oriented to contact substantially against each other with only the thickness of two sections of the flexible receptacle between with adhesive between the sections when the support arms are brought together above the base in order to adhere to two sections of the flexible receptacle.

* * * * *